United States Patent [19]

Sartori et al.

[11] 4,405,577
[45] Sep. 20, 1983

[54] NON-STERICALLY HINDERED-STERICALLY HINDERED AMINE CO-PROMOTED ACID GAS SCRUBBING SOLUTION AND PROCESS FOR USING SAME

[75] Inventors: Guido Sartori, Linden; David W. Savage, Summit, both of N.J.

[73] Assignee: Exxon Research and Engineering Co., Florham Park, N.J.

[21] Appl. No.: 321,103

[22] Filed: Nov. 13, 1981

[51] Int. Cl.³ .................... B01D 53/34; C09K 3/00
[52] U.S. Cl. ................... 423/223; 423/226; 423/228; 423/229; 423/232; 423/234; 252/189; 252/190; 252/192
[58] Field of Search ............... 423/223, 226, 228, 229, 423/232, 234; 252/189, 190, 192

[56] References Cited

U.S. PATENT DOCUMENTS

| | | | |
|---|---|---|---|
| 2,718,454 | 9/1955 | Wylie | 423/232 X |
| 3,144,301 | 8/1964 | Mayland | 423/232 X |
| 3,563,695 | 2/1971 | Benson | 423/232 X |
| 3,563,696 | 2/1971 | Benson | 423/232 X |
| 3,637,345 | 1/1972 | Leder | 423/232 X |
| 3,642,430 | 2/1972 | Benson | 423/232 X |
| 3,793,434 | 2/1974 | Leder | 423/232 X |
| 3,848,057 | 11/1974 | Leder et al. | 423/232 X |
| 3,856,921 | 12/1974 | Shrier et al. | 423/228 |
| 4,094,957 | 6/1978 | Sartori et al. | 423/232 X |
| 4,112,050 | 9/1978 | Sartori et al. | 423/232 X |

FOREIGN PATENT DOCUMENTS

| | | | |
|---|---|---|---|
| 767105 | 11/1971 | Belgium | 423/226 |
| 1305718 | 2/1973 | United Kingdom | 423/226 |

Primary Examiner—Earl C. Thomas
Attorney, Agent, or Firm—Albert P. Halluin; Janet E. Hasak

[57] ABSTRACT

The present invention relates to an alkaline promoter system comprising specific mixtures of nonsterically hindered amino compounds and sterically hindered amino acids and their use in acid gas scrubbing processes. The preferred promoter system comprises a mixture of (i) diethanol amine or 1,6-hexanediamine and (ii) N-secondary butyl glycine or pipecolinic acid.

16 Claims, 1 Drawing Figure

BATCH CO₂ REABSORPTION DATA AT 80°C

BATCH CO₂ REABSORPTION DATA AT 80°C

NON-STERICALLY HINDERED-STERICALLY HINDERED AMINE CO-PROMOTED ACID GAS SCRUBBING SOLUTION AND PROCESS FOR USING SAME

BACKGROUND OF THE INVENTION

1. Field of the Invention

The present invention relates to an alkaline promoter system comprising specific mixtures of non-sterically hindered amino compounds and sterically hindered amino acids and their use in acid gas scrubbing processes, particularly in the "hot pot" type acid gas scrubbing processes.

2. Description of the Related Patents

The present invention pertains to an improved process for carrying out what is known as the aqueous base scrubbing process or "hot potash" ("hot pot") process. In this process a relatively small level of an amine is included as an activator for the aqueous base used in the scrubbing solution. This type of process is generally used where bulk removal of an acid gas, such as $CO_2$, is desired. This process also applies to situations where the $CO_2$ and feed gas pressures are high. In such processes, useful results are achieved using aqueous potassium carbonate solutions and an amine activator. Many industrial processes for removal of acid gases, such as $CO_2$, use regenerable aqueous alkaline scrubbing solutions, such as a potassium carbonate and an activator comprising an amine, which are continuously circulated between an absorption zone where acid gases are absorbed and a regeneration zone where they are desorbed, usually by pressure reduction and steam-stripping. The capital cost of these acid gas scrubbing processes is generally controlled by the size of the absorption and regeneration towers, the size of the reboilers for generating stripping steam, and the size of the condensers which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe processes to improve the efficiency of the "hot potash" process. Some of these improvement processes are described below.

In U.S. Pat. No. 2,718,454, there is described a process for using potash and similar alkali metal salts in conjunction with amines, such as monoethanolamine, diethanolamine and triethanolamine to remove acid gases from a gas mixture. The combination of the alkali metal compounds in conjunction with the designated amine yields higher capacity for acid gases than systems with the amines alone.

In U.S. Pat. No. 3,144,301, there is disclosed the use of potassium carbonate in conjunction with monoethanolamine and diethanolamine to remove $CO_2$ from gaseous mixtures.

U.S. Pat. Nos. 3,563,695; 3,563,696, and 3,642,430 to Benson et al. disclose processes for removing $CO_2$ and $H_2S$ from gaseous mixtures by alkaline scrubbing processes wherein at least two separate regeneration zones are provided. Alkanolamines and amino acids such as glycine are described as activators, but the use of sterically hindered amino compounds is not taught or disclosed in these patents.

In U.S. Pat. Nos. 3,637,345; 3,793,434, and 3,848,057 processes for the removal of acid gases by means of aqueous carbonate scrubbing solutions activated by an amino compound such as 1,6-hexanediamine, piperidine and their derivatives are described.

In U.S. Pat. No. 3,856,921, there is disclosed a process for removal of acid gases from fluids by use of a basic salt of an alkali or alkaline earth metal and an amino compound activator, such as 2-methylaminoethanol, 2-ethylaminoethanol, morpholine, pyrrolidine and derivatives thereof.

Belgian Pat. No. 767,105 discloses a process for removing acid gases from gaseous streams by contacting the gaseous streams with a solution comprising potassium carbonate and an amino acid, such as substituted glycines (e.g., N-isopropyl glycine, N-t-butylglycine, N-cyclohexylglycine, etc.). The data in Table IV of the patent indicates that the highly substituted compounds, such as N-t-butylglycine, are inferior to the straight chain compounds, such as N-n-butyl glycine, but N-cyclohexyl glycine, a sterically hindered amine, has a good rate of absorption. Similarly, British Pat. No. 1,305,718 describes the use of beta- and gamma amino acids as promoters for alkaline salts in the "hot pot" acid gas treating process. These amino acids, however, are not suitable because the beta-amino acids undergo deamination when heated in aqueous potassium carbonate solutions. The gamma amino acids form insoluble lactams under the same conditions.

Recently, it was shown in U.S. Pat. No. 4,112,050 that sterically hindered amines are superior to diethanolamine (DEA) and 1,6-hexanediamine (HMDA) as promoters for alkaline salts in the "hot pot" acid gas scrubbing process. U.S. Pat. No. 4,094,957 describes an improvement to the '050 patented process whereby amino acids, especially sterically hindered amino acids, serve to prevent phase separation of the aqueous solution containing sterically hindered amines at high temperatures and low fractional conversions during the acid gas scrubbing process. In these patents "sterically hindered amines" are defined as amino compounds containing at least one secondary amino group attached to either a secondary or tertiary carbon atom or a primary amino group attached to a tertiary carbon atom. At least one nitrogen atom will have a sterically hindered structure.

In some instances, where an existing commercial gas treating plant utilizes a non-sterically hindered amine promoter such as diethanolamine or 1,6-hexanediamine, there is a need to increase the $CO_2$ scrubbing capacity due to increased levels of $CO_2$ in the gas. The need to meet this increased $CO_2$ capacity can be accomplished by increasing the size of the plant (e.g., adding treating towers and the like) or by replacing the non-sterically hindered amine with sterically hindered amines as proposed in U.S. Pat. Nos. 4,094,957 and 4,112,050. In the case of the latter approach, the preexisting scrubbing solution must be removed and replaced with the fresh solution containing potassium carbonate and sterically hindered amine. This change-over procedure requires some "down-time" of the plant with consequent losses of production. Therefore, increasing the size of the gas treating plant or changing over the scrubbing solution can be costly.

It has now been discovered that one may add sterically hindered amino acids to the non-sterically hindered amino compound-promoted carbonate scrubbing solution and thereby increase the $CO_2$ absorption rate relative to that of the pre-existing non-sterically hindered amino compound-promoted carbonate.

SUMMARY OF THE INVENTION

Accordingly, in one embodiment of the present invention, there is provided a process for the removal of $CO_2$ from a gaseous stream containing $CO_2$ which comprises contacting said gaseous stream as follows:

(1) in an absorption step absorbing said $CO_2$ from said gaseous mixture with an aqueous absorbing solution, comprising:
  (a) a basic alkali metal salt or hydroxide selected from the group consisting of alkali metal bicarbonates, carbonates, hydroxides, borates, phosphates and their mixtures, and
  (b) an activator or promoter system for said basic alkali metal salt or hydroxide, comprising:
    (i) at least one non-sterically hindered amino compound, and
    (ii) at least one sterically hindered amino acid, and
(2) in a desorption and regeneration step, desorbing at least a portion of the absorbed $CO_2$ from said absorbing solution.

The mole ratio of the non-sterically hindered amino compound to the sterically hindered amino acid may vary widely, but is preferably 1:3 to 3:1, most preferably 1:1. The sterically hindered amino acid may be added to the scrubbing solution containing the non-sterically hindered amino compound all at once or in increments during the gas scrubbing operation.

As another embodiment of the invention, there is provided an acid gas scrubbing composition, comprising:
  (a) 10 to about 40% by weight of an alkali metal salt or hydroxide;
  (b) 2 to about 20% by weight of a non-sterically hindered amino compound;
  (c) 2 to about 20% weight of a sterically hindered amino acid; and
  (d) the balance, water.

The non-sterically hindered amino compound may be any compound having amino functionality which is water soluble in the presence of the sterically hindered amino acid co-promoter. Typically, the non-sterically hindered amino compound will comprise those amino compounds heretofore used or described in acid gas treating processes. By the term "non-sterically hindered", it is meant those compounds that do not contain at least one secondary amino group attached to either a secondary or tertiary carbon atom or a primary amino group attached to a tertiary carbon atom. Typically, the nitrogen atoms will not have a sterically hindered structure. For example, such compounds will include diethanolamine, monoethanolamine, triethanolamine, 1,6-hexanediamine, piperidine and their derivatives and the like. Preferably, the non-sterically hindered amino compound will be diethanolamine or 1,6-hexanediamine which are presently used in commercial acid gas treating plants throughout the world.

The sterically hindered amino acids may include any amino acid which is soluble in the alkaline aqueous solution to be used in the acid gas treating solution. Preferably, the amino acid will have 4 to 8 carbon atoms and contain one amino moiety. By the term "sterically hindered amino acid", it is meant those amino acids that do contain at least one secondary amino group attached to either a secondary or tertiary carbon atom or a primary amino group attached to a tertiary carbon atom. At least one of the nitrogen atoms will have a sterically hindered structure. Typical sterically hindered amino acids useful in the practice of the present invention will include N-secondary butyl glycine, pipecolinic acid, N-isopropyl glycine, N-2-amyl-glycine, N-isopropyl alanine, N-sec. butyl alanine, 2-amino-2-methyl butyric acid and 2-amino-2-methyl valeric acid.

In general, the aqueous scrubbing solution will comprise an alkaline material comprising a basic alkali metal salt or alkali metal hydroxide selected from Group IA of the Periodic Table of Elements. More preferably, the aqueous scrubbing solution comprises potassium or sodium borate, carbonate, hydroxide, phosphate or bicarbonate. Most preferably, the alkaline material is potassium carbonate.

The alkaline material comprising the basic alkali metal or salt or alkali metal hydroxide may be present in the scrubbing solution in the range from about 10% to about 40% by weight, preferably from 20% to about 35% by weight. The alkaline material, the non-sterically hindered amine and the amino acid activator or promoter system remain in solution throughout the entire cycle of absorption of $CO_2$ from the gas stream and desorption of $CO_2$ from the solution in the regeneration step. Therefore, the amounts and mole ratio of the non-sterically-hindered amines and the amino acids are maintained such that they remain in solution as a single phase throughout the absorption and regeneration steps. Typically, these criteria are met by including from about 2 to about 20%, preferably from 5 to 15% more preferably, 5 to 10% by weight of the non-sterically hindered amino compound and from 2 to about 20% by weight, preferably 5 to about 15% by weight of the sterically hindered amino acid.

The scrubbing solution may be premixed and placed into use in the absorbing reactors. Alternatively, in an existing acid gas treating plant where the non-sterically hindered amino compound is being used, the sterically hindered amino acid may be added to the scrubbing solution, preferably in increments.

The aqueous scrubbing solution may include a variety of additives typically used in acid gas scrubbing processes, e.g., antifoaming agents, anti-oxidants, corrosion inhibitors and the like. The amount of these additives will typically be in the range that they are effective, i.e., an effective amount.

DESCRIPTION OF THE PREFERRED EMBODIMENTS

Figure 1:
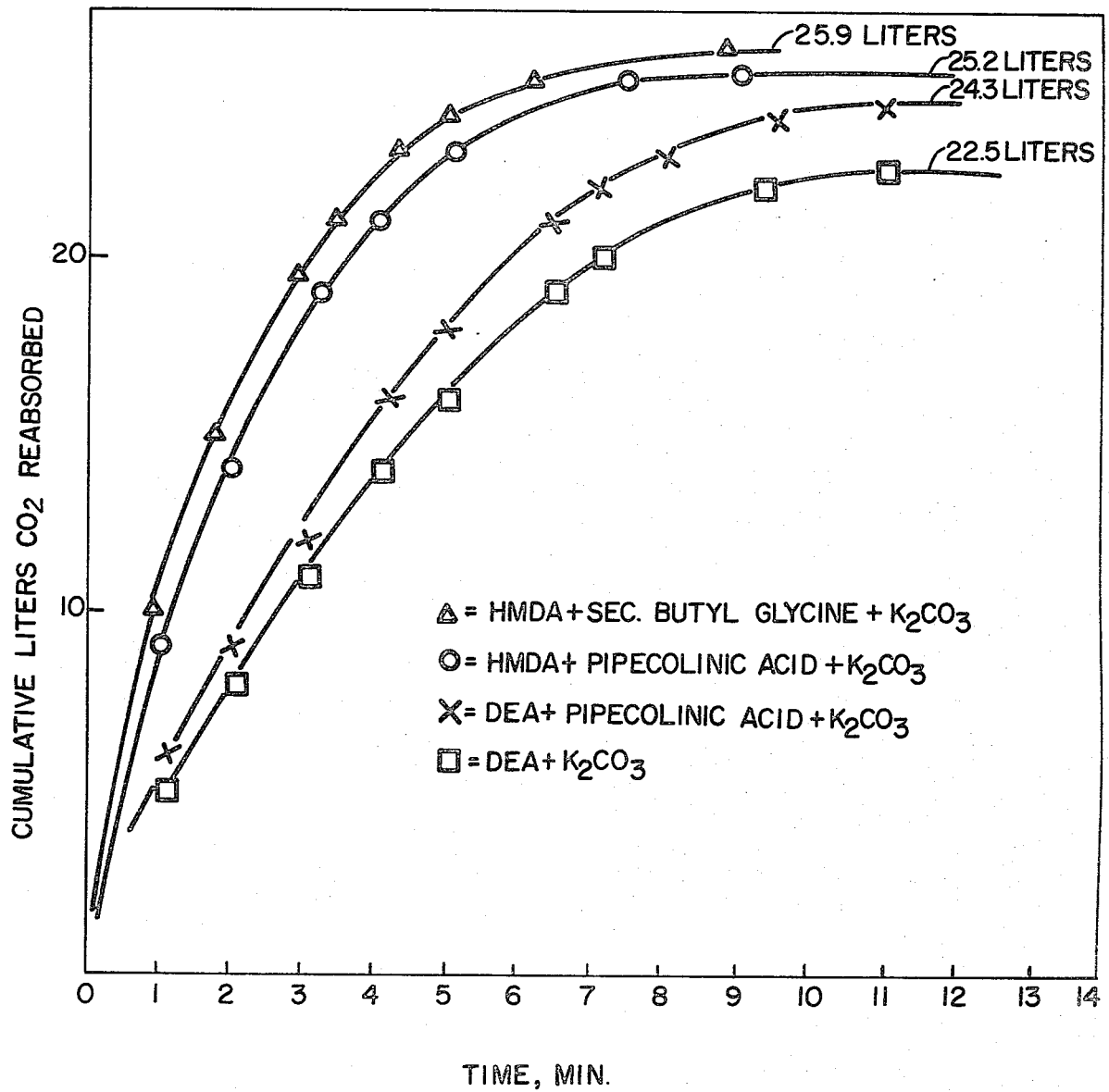
FIG. 1 graphically illustrates the capacity for potassium carbonate solutions activated by diethanolamine (DEA) and mixtures of diethanolamine/pipecolinic acid, 1,6-hexanediamine (HMDA) and 1,6-hexanediamine/N-secondary butyl glycine (SBG) at 80° C. wherein the cumulative liters of $CO_2$ reabsorbed is a function of time.

The term acid gas includes $CO_2$ alone or in combination with $H_2S$, $CS_2$, HCN, COS and the oxides and sulfur derivatives of $C_1$ to $C_4$ hydrocarbons. These acid gases may be present in trace amounts within a gaseous mixture or in major proportions.

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, metal or ceramic rings or with bubble cap or sieve plates, or a bubble column reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber, the pressures will range from about 0 to 1000 psia. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. The amino acid aids in reducing foam in the contacting vessels.

The aqueous absorption solution comprising the alkaline material, the activator system comprising the non-sterically hindered amino compound and the sterically hindered acid which is saturated or partially saturated with gases, such as $CO_2$ and $H_2S$ may be regenerated so that it may be recycled back to the absorber. The regeneration should also take place in a single liquid phase. Therefore, the presence of the highly water soluble amino acid provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The stripping steam may be generated by boiling the solution. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention is facilitated by the use of the highly water soluble amino acid in the mixture.

As a typical example, during desorption, the acid gas, e.g., $CO_2$-rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will be about 100° to about 140° C. during desorption. Single phase is maintained during desorption by regulating the amount of acid gas, e.g., $CO_2$, recovered.

In the most preferred embodiment of the present invention, the acid gas, e.g., $CO_2$ is removed from a gaseous stream by means of a process which comprises, in sequential steps, (1) contacting the gaseous stream with a solution comprising 10 to about 40 weight percent, preferably 20 to about 30 weight percent of potassium carbonate, an activator or promoter system comprising 2 to about 20 weight percent, preferably 5 to about 15 weight percent, more preferably 5 to about 10 weight percent of at least one non-sterically hindered amino compound as herein defined, 2 to about 20 weight percent, and preferably 5 to about 15 weight percent of the sterically hindered amino acid as herein defined, the balance of said solution being comprised of water, said contacting being conducted at conditions whereby the acid gas is absorbed in said solution, and preferably at a temperature ranging from 25° to about 200° C., more preferably from 35° to about 150° C. and a pressure ranging from 100 to about 1500 psig, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is greater than that obtained under the same operating conditions for removing acid gases from gaseous streams, wherein said same operating conditions do not include the mixture of the non-sterically hindered amino compound and the sterically hindered amino acid co-promoter system. In other words, working capacity is defined as follows:

$CO_2$ in solution at completion of absorbtion  less  $CO_2$ in solution at completion of desorption Which is:

$$\frac{\text{Moles of CO}_2 \text{ Absorbed}}{\text{Initial Moles K}_2\text{CO}_3} \text{ less } \frac{\text{Moles Residual CO}_2 \text{ Absorbed}}{\text{Initial Moles K}_2\text{CO}_3}$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity, that is the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) solution composition, that is weight percent of the non-sterically hindered amino compound, weight percent of the sterically hindered amino acid and weight percent of the alkaline salt or hydroxide, for example potassium carbonate, and (6) gas composition. The skilled artisan may conveniently demonstrate the improved process which results by use of the non-sterically hindered amino-compound and the sterically hindered amino acid mixture by a comparison directly with a process wherein the mixture is not included in the aqueous scrubbing solution. For example, it will be found when comparing two similar acid gas scrubbing processes (that is similar gas composition, similar scrubbing solution composition, similar pressure and temperature conditions) that when the sterically hindered amino acid is utilized in the mixture the difference between the amount of acid gas, e.g., $CO_2$ absorbed at the end of step 1 (absorption step) defined above and step 2 (desorption step) defined above is significantly greater. This significantly increased working capacity is observed even though the scrubbing solution that is being compared comprises an equimolar amount of a prior art amine promoter, such as diethanolamine, 1,6-hexanediamine, (alone) etc. It has been found that the use of the admixture of the non-sterically hindered amino compound and the sterically hindered amino acid of the invention provides a working capacity which is greater than the working capacity of a scrubbing solution which does not utilize this new activator or promoter system.

Besides increasing working capacity and rates of absorption and desorption, the use of the admixture of the non-sterically hindered amino compound and sterically hindered amino acid leads to lower steam consumption during desorption.

Steam requirements are the major part of the energy cost of operating an acid gas, e.g., $CO_2$ scrubbing unit. Substantial reduction in energy, i.e., operating costs will be obtained by the use of the process wherein the mixture is utilized. Additional savings from new plant investment reduction and debottlenecking of existing plants may also be obtained by the use of the mixture of the invention. The removal of acid gases such as $CO_2$ from gas mixtures is of major industrial importance, particularly the systems which utilize potassium carbonate activated by the unique activator or co-promoter system of the present invention.

The absorbing solution of the present invention, as described above, will be comprised of a major proportion of alkaline materials, e.g., alkali metal salts or hydroxides and a minor proportion of the activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

Many of the sterically hindered amino acids useful in the practice of the present invention are either available commercially or may be prepared by various known procedures.

Preferred sterically hindered amino acids include N-secondary butyl glycine, N-2-amyl glycine, N-isopropyl glycine, pipecolinic acid, N-isopropyl glycine, N-2-amyl-glycine, N-isopropyl alanine, N-sec. butyl alanine, 2-amino-2-methyl butyric acid and 2-amino-2-methyl valeric acid.

N-secondary butyl glycine has the CAS Registry Number of 58695-42-4 and is mentioned as an intermediate in several U.S. Patents, e.g., U.S. Pat. Nos. 3,894,036; 3,933,843; 3,939,174 and 4,002,636, as well as the published literature (Kirino et al, Agric. Biol. Chem., 44(1), 31 (1980), but nothing is said in these disclosures about the synthesis of this amino acid or its use as a carbonate promoter in acid gas scrubbing processes.

A preferred method for preparing the preferred sterically hindered amino acids comprises first reacting glycine or alanine under reductive conditions with a ketone in the presence of a hydrogenation catalyst. This reaction produces the sterically hindered monosubstituted amino acid. This process is more fully described and claimed in U.S. Ser. No. 321,058, filed concurrently herewith, entitled, "Amino Acids and Process for Preparing the Same" the disclosure of which is incorporated herein by reference. Preferred non-sterically hindered amino compounds include: diethanolamine, monoethanolamine, triethanolamine, 1,6-hexanediamine, piperidine, etc.

The invention is illustrated further by the following examples which, however, are not to be taken as limiting in any respect. All parts and percentages, unless expressly stated to be otherwise, are by weight.

"HOT POT" ACID GAS TREATING PROCESS

Example 1 (Comparison)

The reaction apparatus consists of an absorber and a desorber as shown in FIG. 1 of U.S. Pat. No. 4,112,050, incorporated herein by reference. The absorber is a vessel having a capacity of 2.5 liters and a diameter of 10 cm., equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents are put into a 2-liter Erlenmeyer:

37.8 g of diethanolamine
187.5 g of $K_2CO_3$
525 g of water

When all the solid has dissolved, the mixture is put into the absorber and brought to 80° C. The apparatus is closed and evacuated until the liquid begins to boil. At this point $CO_2$ is admitted. In total 29 liters of $CO_2$ is absorbed.

The rich solution is transferred to the desorber and boiled for one hour, during which time 21 liters of $CO_2$ is desorbed.

The regenerated solution so obtained is transferred back to the absorber and cooled to 80° C. The apparatus is closed and evacuated until the liquid begins to boil. At this point $CO_2$ is admitted. 20.5 liters of $CO_2$ is reabsorbed, of which 6 liters are re-absorbed in the first minute.

Example 2 (Comparison)

The procedure described above in Example 1 is repeated except that the solution charged into the 2-liter Erlenmeyer is as follows:

41.4 g of 1,6-hexanediamine (HMDA)
187.5 g of $K_2CO_3$
520 g of water

A total of 30.7 liters of $CO_2$ is absorbed. The rich solution transferred to the desorber and boiled for one hour. The regenerated solution so obtained is transferred back to the absorber and cooled to 80° C. The apparatus is closed and evacuated until the liquid begins to boil. At this point $CO_2$ is admitted and 21.2 liters of $CO_2$ is re-absorbed, of which 6 liters is re-absorbed in the first minute.

Example 3

The procedure of Example 1 is repeated for several acid gas scrubbing solutions containing a mixture of the non-sterically hindered amino compound, e.g. diethanolamine (DEA) or 1,6-hexanediamine (HMDA) and the sterically hindered amino acid co-promoter of the present invention. The results of these tests along with the results of comparative Examples 1 and 2 are shown in Tables I and II.

TABLE I
EXPERIMENTS IN 25 WT % $K_2CO_3$

| Amine Activator(s) | Total Liters $CO_2$ Reabsorbed | Liters $CO_2$ Reabsorbed in 1st Minute |
|---|---|---|
| .357 moles DEA[1] | 20.5 | 6 |
|  | 21.5 | 6 |
|  | 21.6 | 6 |
| .357 moles HMDA[2] | 21.2 | 6 |
| .714 moles DEA | 22.5 | 8 |
|  | 22.7 | 8 |
| .357 moles DEA + .357 moles SBG[3] | 28.2 | 13 |
|  | 27.6 | 12 |
| .357 moles HMDA + .357 moles PA[4] | 25.2 | 8 |
| .357 moles HMDA + .357 moles SBG | 25.9 | 10 |

[1]DEA is diethanolamine
[2]HMDA is 1,6-hexanediamine
[3]SBG is N—sec. butyl glycine
[4]PA is pipecolinic acid

TABLE II
EXPERIMENTS IN 30 WT % $K_2CO_3$

| Amine Activator(s) | Liters $CO_2$ Reabsorbed | 1st Minute |
|---|---|---|
| .357 moles DEA[1] | 24.2 | 7 |
|  | 24.2 | 6 |
| .714 moles DEA | 25.4 | 8 |
| .357 moles DEA + .178 moles SBG[3] | 29.4 | 11 |
|  | 28.7 | 11 |
| .357 moles HMDA[2] + .178 moles PA[4] | 27.2 | 9 |
|  | 26.6 | 9 |

[1]DEA is diethanolamine
[2]HMDA is 1,6-hexanediamine
[3]SBG is N—sec. butyl glycine
[4]PA is pipecolinic acid It can be seen from the data in Tables I and II that the addition of the sterically hindered amino acid improves the capacity and rate of reabsorption of the $CO_2$ compared to the scrubbing solution containing the non-sterically hindered amino compound without the sterically hindered amino acid. These results are illustrated in FIG. 1 in the case of the DEA, DEA-pipecolinic acid, HMDA-pipecolinic acid and HMDA-N-secondary butyl glycine promoted solutions wherein the cumulative liters of $CO_2$ reabsorbed at 80° C. as a function of time are plotted graphically. Here it is clear that the sterically hindered amino acids, particularly N-secondary butyl glycine enhance the reabsorption of $CO_2$.

Example 4

(a) Aging Studies in $CO_2$ Scrubbing Apparatus

The following experiments are carried out to ascertain the stability of the amino acids under accelerated-simulated acid gas treating conditions.

The following reagents are charged into a stainless-steel bomb:

121 g of N-sec. butyl glycine
433 g of $KHCO_3$
540 g of $H_2O$

The bomb is put into an oven and heated at 120° C. for 1000 hours. Then the content is discharged into a 2 liter flask and refluxed for several hours.

750 g is taken and subjected to an absorption-desorption-reabsorption cycle as described in Example 1. 27.9 liters of $CO_2$ is absorbed into the regenerated solution, 10 liters being absorbed in the first minute.

Comparison of this result with that obtained with the fresh solution, described in Example 1 of U.S. Ser. No. 321,063, filed concurrently herewith, entitled "N-secondary butyl glycerine promoted acid gas scrubbing process" shows that the aging process does not lead to a significant loss of activity.

If the aging experiment is carried out after replacing N-sec. butyl glycine with the equivalent amount of N-cyclohexyl glycine, 145 g, and reducing the water to 516 g in order to have the same total weight, a considerable amount of solid, identified as 1,4-bis-cyclohexyl-2,5-diketopiperazine is formed. An attempt to carry out an absorption-desorption cycle causes plugging of the unit.

(b) Aging Under $CO_2$ and $H_2S$

The following reagents are charged into a stainless-steel bomb:

121 g of N-sec. butyl glycine
24 g of $K_2S$
390 g of $KHCO_3$
544 g of water

The bomb is put into an oven and heated at 120° C. for 1000 hours. Then the content is discharged into a 2 liter flask and refluxed for several hours.

765 g is taken and subjected to an absorption-desorption-reabsorption cycle as described in Example 1. 28.9 liters of $CO_2$ is absorbed into the regenerated solution, 10 l being absorbed in the first minute.

Comparison of this result with that obtained with the fresh solution described in Example 1 of U.S. Ser. No. 321,063, filed concurrently herewith, entitled "N-secondary butyl glycine promoted acid gas scrubbing process" shows that the aging process leads to only a slight loss of activity.

If the aging experiment is carried out after replacing N-secondary butyl glycine with the equivalent amount of N-cyclohexyl glycine, 145 g, and reducing the water to 516 g in order to have the same total weight, a considerable amount of solid, identified as 1,4-biscyclohexyl-2,5-diketopiperazine is formed. An attempt to carry out an absorption-desorption cycle causes plugging of the unit.

The excellent stability under the aging conditions shown above for the N-secondary butyl glycine coupled with its good performance as a promoter demonstrates the desirability of using it in combination with non-sterically hindered amines.

Example 5

This example is given in order to show that beta-amino acids are not stable under alkaline conditions. The following solution is prepared in a 2-liter Erlenmeyer:

| | |
|---|---|
| 49.7 g of | (CH$_3$)$_2$N—CH$_2$CH$_2$CH$_2$NH—CH(CH$_3$)CH$_2$COOH |
| 64.0 g of | C$_6$H$_{11}$N(CH$_3$)—CH$_2$CH$_2$CH$_2$NH—CH(CH$_3$)CH$_2$COOH |
| 411 g | H$_2$O |
| 225 g | K$_2$CO$_3$ |

When everything is dissolved, the solution is put into the absorber described in Example 1. An absorption-desorption-reabsorption cycle as described in Example 1 gives 32.2 liters of CO$_2$ reabsorbed, of which 11 liters are absorbed in the first minute.

The aged solution is prepared in the following way. The following reagents are charged into a stainless-steel bomb:

| | |
|---|---|
| 66.3 g of | (CH$_3$)$_2$N—CH$_2$CH$_2$CH$_2$NH—CH(CH$_3$)CH$_2$COOH |
| 85.3 g of | C$_6$H$_{11}$N(CH$_3$)—CH$_2$CH$_2$CH$_2$NH—CH(CH$_3$)CH$_2$COOH |
| 391.5 g of | KHCO$_3$ |
| 23.9 g of | K$_2$S |
| 509 g of | H$_2$O |

The bomb is put into an oven at 120° C. and left there for 1000 hrs. After that, the bomb content is put into a 2-liter flask and boiled at reflux for some hours. 750 g of the solution so obtained is used to carry out a standard absorption-desorption-reabsorption test. Only 25 liters of CO$_2$ is reabsorbed, of which 6 liters are reabsorbed in the first minute.

$^{13}$C-NMR analysis of the aged solution shows the presence of 32 peaks, whereas the fresh solution only has 18. The aged solution shows the presence of olefin bonds, which indicates that aging has led to decomposition of the diamino acids into diamines and crotonic acid.

The results shown above with respect to the beta-diamino acids agree with those obtained by Corbett, McKay and Taylor, *J. Chem Soc.* 5041 (1961) on beta-mono-amino acids.

The excellent stability under the aging conditions shown above for N-secondary butyl glycine compared with other amino acids coupled with its good performance as a co-promoter for the non-sterically hindered amino compounds demonstrates the desirability of using this admixture as a co-promoter system, particularly in de-bottlenecking existing acid gas treating processes which employ non-sterically hindered amino compounds.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of CO$_2$ from a gaseous stream containing CO$_2$ which comprises contacting said gaseous stream
   (1) in an absorption step absorbing said CO$_2$ from said gaseous stream with an aqueous absorbing solution comprising (a) a basic alkali metal salt or hydroxide selected from the group consisting of alkali metal bicarbonates, carbonates, hydroxides, borates, phosphates and their mixtures, and (b) an activator or promoter system for said basic alkali metal salt or hydroxide, comprising:
      (i) at least one non-sterically hindered amino compound, and
      (ii) at least one sterically hindered amino acid, and
   (2) in a desorption and regeneration step, desorbing at least a portion of the absorbed CO$_2$ from said absorbing solution.

2. The process of claim 1 wherein the basic alkali metal salt or hydroxide is potassium carbonate.

3. The process of claim 1 wherein the aqueous solution contains 10 to about 40% by weight of said basic alkali metal salt or hydroxide.

4. The process of claim 1 wherein the aqueous solution contains 2 to about 20% by weight of said non-sterically hindered amino compound and 2 to about 20% by weight of said sterically hindered amino acid.

5. The process of claim 4 wherein the mole ratio of said non-sterically hindered amino compound to said sterically hindered amino acid ranges between 0.2 and 5.

6. The process of claim 1 wherein said non-sterically hindered amino compound is selected from the group consisting of diethanolamine and 1,6-hexanediamine.

7. The process of claim 1 wherein said sterically hindered amino acid is selected from the group consisting of N-secondary butyl glycine and pipecolinic acid.

8. The process of claims 1, 2, 3, 4, 5, 6 or 7 wherein the temperature of the absorbing solution during the absorption step is in the range from about 25° to about 200° C., the pressure in the absorber ranges from about 5 to about 2000 psia and the partial pressure of the acid gas components in the feed stream ranges from about 0.1 to about 500 psia, and wherein the temperature of the absorbing solution during the regeneration step ranges from about 25° to about 200° C., and at pressures ranging from about 16 to about 100 psia.

9. The process of claim 8 wherein the absorbing solution additionally includes additives selected from the group consisting of antifoaming agents, antioxidants and corrosion inhibitors.

10. The process of claim 1 wherein said sterically hindered amino acid is added to the absorbing solution containing the non-sterically hindered amino compound and basic alkali metal salt or hydroxide.

11. A process for the removal of $CO_2$ from a gaseous stream containing $CO_2$ which comprises, in sequential steps:
   (1) contacting the gaseous stream with an aqueous absorbing solution comprising (a) from about 20 to about 30% by weight of potassium carbonate, and (b) an activator or promoter system for the potassium carbonate, comprising:
      (i) from about 5 to about 15% by weight of diethanol amine or 1,6-hexane diamine,
      (ii) 5 to about 10% by weight of N-secondary butyl glycine or pipecolinic acid,
      (iii) the balance of the aqueous solution comprising water and additives selected from the group consisting of antifoaming agents, antioxidants and corrosion inhibitors, wherein said contacting is conducted at conditions whereby $CO_2$ is absorbed in said absorbing solution and the temperature of the absorbing solution is in the range from about 35° to about 150° C., and the pressure in the absorber is in the range from about 100 to about 1500 psig; and
   (2) regenerating said absorbing solution at conditions whereby $CO_2$ is desorbed from said absorbing solution, wherein the regeneration takes place at temperatures ranging from about 35° to about 150° C. and at pressures ranging from about 0 to about 100 psig.

12. The process of claim 11 wherein the absorbing solution from the regeneration step is recycled for reuse in the absorption step.

13. An aqueous acid gas scrubbing composition comprising: (a) 10 to about 40% by weight of an alkali metal salt or hydroxide, (b) 2 to about 20% by weight of a non-sterically hindered amino compound, (c) 2 to about 20% by weight of a sterically hindered amino acid.

14. The composition of claim 13 wherein said alkali metal salt or hydroxide is potassium carbonate, said non-sterically hindered amino compound is selected from the group consisting of diethanol amine and 1,6-hexanediamine and said sterically hindered amino acid is selected from the group consisting of N-secondary butyl glycine and pipecolinic acid.

15. The composition of claim 13 wherein said composition contains (a) 20 to about 30% by weight potassium carbonate; (b) 5 to about 10% by weight of diethanol amine; (c) 5 to about 10% by weight of N-secondary butyl glycine or pipecolinic acid, and the balance, water.

16. The composition of claims 13, 14 or 15 wherein the composition additionally includes antifoaming agents, antioxidants and corrosion inhibitors.

* * * * *